(12) United States Patent
Guo et al.

(10) Patent No.: US 12,369,186 B2
(45) Date of Patent: Jul. 22, 2025

(54) COMMUNICATION AND COMPUTATION AWARE DISTRIBUTED MACHINE LEARNING FOR VEHICULAR NETWORKS

(71) Applicant: Mitsubishi Electric Research Laboratories, Inc., Cambridge, MA (US)

(72) Inventors: Jianlin Guo, Newton, MA (US); Ferdous Pervej, Raleigh, NC (US); Kyeong-Jin Kim, Lexington, MA (US); Kieran Parsons, Cambridge, MA (US); Philip Orlik, Cambridge, MA (US); Stefano Di Cairano, Newton, MA (US); Marcel Menner, Cambridge, MA (US); Karl Berntorp, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 615 days.

(21) Appl. No.: 17/652,145

(22) Filed: Feb. 23, 2022

(65) Prior Publication Data
US 2023/0269766 A1  Aug. 24, 2023

(51) Int. Cl.
 *H04W 74/00* (2009.01)
 *G06F 18/214* (2023.01)
 (Continued)

(52) U.S. Cl.
 CPC ........ *H04W 74/006* (2013.01); *G06F 18/214* (2023.01); *G06N 20/00* (2019.01);
 (Continued)

(58) Field of Classification Search
 CPC ..... H04W 74/006; H04W 4/44; G06F 18/214; G06K 9/6256; G06N 20/00; G06N 3/0442;
 (Continued)

(56) References Cited

U.S. PATENT DOCUMENTS

2018/0122237 A1* 5/2018 Nascimento ........... G08G 1/127

FOREIGN PATENT DOCUMENTS

CN  114051222 A * 2/2022

OTHER PUBLICATIONS

CN114051222A—Google Patents (English Translation) (Year: 2024).*
(Continued)

*Primary Examiner* — Ji-Hae Yea
(74) *Attorney, Agent, or Firm* — Gene Vinokur

(57) ABSTRACT

A computer-implemented method is provided for training a global machine learning model using a learning server and a set of vehicle agents connected to roadside units (RSUs). It involves selecting agents, associating them with RSUs based on proximity, and transmitting training data and deadlines. Agents train models locally, which are then aggregated through RSUs to refine the global model to desired precision. The method includes steps of selecting vehicle agents from a pool of the vehicle agents connected to the RSUs, associating the selected vehicle agents and the RSUs respectively based on distances from the selected vehicle agents to the RSUs configured to provide measurements of the distances to the learning server, and transmitting a global model, a selected agent set and deadline thresholds in each global training round to the RSUs configured to transmit the global model and training deadlines to the selected vehicle agents.

22 Claims, 11 Drawing Sheets

(51) Int. Cl.
*G06N 20/00* (2019.01)
*G08G 1/01* (2006.01)
*H04W 4/44* (2018.01)

(52) U.S. Cl.
CPC ......... *G08G 1/0116* (2013.01); *G08G 1/0133* (2013.01); *G08G 1/0141* (2013.01); *H04W 4/44* (2018.02)

(58) Field of Classification Search
CPC .... G06N 3/098; G08G 1/0116; G08G 1/0133; G08G 1/0141; H04L 67/12; H04L 67/34; G06V 10/774; G06V 30/19147
See application file for complete search history.

(56) References Cited

OTHER PUBLICATIONS

Liang et al. ("Semi-Synchronous Federated Leaning Protocol With Dynamic Aggregation in Internet of Vehicles", IEEE Transactions on Vehicular Technology, vol. 71, No. 5, Feb. 7, 2022, pp. 4677-4691) (Year: 2022).*

Liang et al. Semi Synchronous Federated Learning Protocol with Dynamic Aggregation in Internet of Vehicles, IWWW Transactions of Vehicular Technology. vol. 71, No. 5. Feb. 7, 2022, pp. 4677-4691.

Pervej et al., Mobility Communication and Computation Aware Federated Learning for Internet of Vehicles, 2022 IEEE Intelligent Vehicles Symposium, IV. Jun. 4, 2022, pp. 750-757.

* cited by examiner

Algorithm 1: Optimal Radio Resource Allocation

1: Input: $\{\Gamma_{b,z}^{v,\mu p}\}$ for all active RSUs and vehicle agents ;
2: for $b \in \mathcal{B}$ do
3:    Schedule agents following round-robin scheduling;
4:    if $|\mathcal{V}_k^{(b)}| \neq 0$ then
5:       Initiate gain matrix, $G_b = zeros(Z_b \times |\mathcal{V}_k^{(b)}|)$ ;
6:       for $v \in \mathcal{V}_k^{(b)}$ do
7:          for $z_b \in \mathcal{Z}_b$ do
8:             $G_b[z_b, v] \leftarrow \Gamma_{b,z}^{v,\mu p}$ ;
9:          end
10:       end
11:    Use Hungarian algorithm to get optimal $\mathbb{W}_{b,z}$ s ;
12: end

FIG. 6

Algorithm 2: Location-Aware Vehicle Association

1 Input: locations of the vehicles and RSUs ;
2 Initialize $\mathbf{D} = zeros(V,B)$, $\mathbf{A} = zeros(V,B)$ ;
3 for $v \in \mathcal{V}$ do
4     for $b \in \mathcal{B}$ do
5         Calculate distance, $d_v^b$, from $v$ to RSU $b$;
6         $\mathbf{D}[v,b] \leftarrow d_v^b$
7     end
8     Associate $v$ to the shortest distance RSU $b$ and set $\mathbf{A}[v,b] \leftarrow 1$;
9 end
10 Return: $\mathbf{D}$ and $\mathbf{A}$

FIG. 7

Algorithm 3: Vehicular FL Algorithm

1. Input: initial global model $\mathbf{w}$;
2. for *all global communication round, $k \in K$* do
   /* At the beginning of communication round $k$ */
3.    Server selects learning agents $\mathcal{V}_k \subseteq \mathcal{V}$;
4.    Each RSU solves optimization problem (15) and distributes the global model $\mathbf{w}_k$   ▷ *Central server broadcasts global model $\mathbf{w}_k$, agents set $\mathcal{V}_k$, $d^{cmp}$ and threshold $d^{thr}$ to RSUs. RSUs then forward the global model $\mathbf{w}_k$ and the updated time information $d_v^{cmp}$ to their associated $v \in \mathcal{V}_k$;*
   /* Local model training */
5.    for *all $v \in \mathcal{V}_k$ in parallel* do
6.       Prepare the local training dataset $\mathcal{D}_v$;
7.       Determine local training iterations $L_v$ using equation (18);
8.       Perform local training to minimize loss function defined in problem (8);
9.    end
   /* At the end of global round $k$ */
10.   All $v \in \mathcal{V}_k$ request uplink radio resources from their associated RSUs to offload their locally trained model $\mathbf{w}_k^v$;
11.   Each RSU $b$ solves optimization problem (16) to get the optimal pRB allocation and schedules its associated agents $v \in \mathcal{V}_k^b$ in round-robin manner;
12.   Each agent $v \in \mathcal{V}_k$ then offloads $\mathbf{w}_k^v$ to the central server via the associated RSU $b$;
13.   The central server performs model aggregation to update global model using: $\mathbf{w}_{k+1} \leftarrow \frac{1}{|\mathcal{V}_k|} \sum_{v=1}^{|\mathcal{V}_k|} \mathbf{w}_k^v$.
14. end
15. Output: trained global model $\mathbf{w}^*$

FIG. 8

COMMUNICATION AND COMPUTATION AWARE DISTRIBUTED MACHINE LEARNING FOR VEHICULAR NETWORKS

FIELD OF THE INVENTION

The invention relates generally to machine learning for vehicular traffic systems, and more particularly to methods and apparatus of the distributed machine learning for predictions in vehicular networks.

BACKGROUND OF THE INVENTION

Modern vehicles are packed with various on-board sensors to collect data as vehicles move along the roads, while the on-board processors can train machine learning models using collected data to accomplish higher automation levels. Different from conventional vehicles, the modern vehicles are much more intelligent. They are not only capable of collecting various vehicle data and traffic data but also capable of running advanced algorithms to guide their motion.

However, realizing intelligent traffic is an extremely difficult problem. Physical roads form a complex road network. Most importantly, traffic conditions such as congestion at one location can propagate to and impact on traffic conditions at other locations. Furthermore, the unexpected events such as traffic accident and driver behave can make the traffic condition even more dynamic and uncertain. All these factors can impact individual vehicle motion. Therefore, how to accurately predict vehicle motion and apply the prediction to optimize vehicle operation is very challenging.

Data-driven machine learning techniques have become solutions to many applications such as image processing and voice recognition. However, applying machine learning to vehicular applications is still faces challenging due to unique characteristics of vehicular environment including high mobility, communication cost, data privacy, high safety requirement, etc.

On the one hand, although vehicles may train independent machine learning models such as Long Short-Term Memory (LSTM), data collected by individual vehicle may contain imperfection, which may lead to non-robust models, whose prediction performance may not suffice for the high accuracy demanding vehicular applications or may even result in wrong decision making. Therefore, non-robust machine learning model trained based on imperfected data may not be acceptable in vehicular applications. In addition, data collected by individual vehicle is not sufficient to train the large-scale machine learning models that can be used by the vehicle on the road. For example, due to the limited on-board computation power and memory, a vehicle cannot quickly train a machine learning model that can be applied at locations where the vehicle has not traveled. Therefore, training independent machine learning models by individual vehicle is not a practical solution.

On the other hand, transferring data collected by vehicles to a central sever for centralized machine learning model training is impractical due to enormous communication bandwidth requirement and the extensive threat of sharing private information. In addition, different vehicles are equipped with different sensors based on their model, size, weight, age and computation resources. Therefore, data collected by vehicles are highly heterogenous. As a result, the central server may not have necessary information to process such heterogenous data. For example, a high-end GPS receiver provides more accurate measurement than a low-end GPS receiver does. Furthermore, even same GPS receiver is more accurate in open area than in urban area. Therefore, new solutions are urgently needed.

The recent advances of privacy-preserving distributed machine learning such as federated learning (FL) can bring a potential solution. The distributed machine learning is an advanced machine learning technique that allows training machine learning models locally based on the trainer's local data. Therefore, it ensures user privacy protection and can also effectively address communication cost issue without data transfer. Most importantly, the distributed machine learning incorporates data features from collaborative datasets, which allows robust machine learning model training by eliminating data imperfection contained in individual dataset. The well-trained robust models can be distributed to the on-road vehicles for their prediction tasks at any time any location. Therefore, with the rising demand for higher automation, the distributed machine learning incorporating mobility, communication and computation seems inevitable.

While the distributed vehicular machine learning can indeed bring manifold benefits, it also faces new challenges in vehicular networks. For example, the high mobility and the delay are two of the major concerns for the distributed machine learning in the vehicular environment. On the one hand, the time a vehicle connects to a connection point may be short due to the high mobility. Thus, the vehicle may only have limited time to finish the model training. On the other hand, training machine learning model is time consuming, especially multi-round distributed training. Global distribution time, local model uploading time, local model training time, model queueing time, etc., contribute to the delay in distributed machine learning model training. In addition, the training times from different vehicles can significantly vary due to the heterogeneous computation resources and dataset. Therefore, the distributed machine learning for vehicular networks must address these issues.

Accordingly, there is a need to provide a robust communication-computation aware distributed machine learning platform for vehicular networks.

SUMMARY OF THE INVENTION

It is one object of some embodiments to provide a communication-computation aware distributed machine learning platform to incorporate mobility, communication, computation and the data heterogeneity for the accurate vehicle metric prediction. Additionally, it is another object of some embodiments to take vehicle specific power (VSP) as an example metric for prediction.

Some embodiments are based on the recognition that unlike general traffic metrics such as traffic flow, traffic density and average traffic speed, the individual vehicle metrics such as location, velocity, acceleration and VSP is more useful to optimize vehicle operation. To realize optimal vehicle operation, the prediction of vehicle metrics is critical, especially for automated and autonomous driving.

Accordingly, some embodiments of the invention provide the distributed machine learning techniques to accurately predict individual vehicle metrics to optimize vehicle operation.

Some embodiments are based on the recognition that modern vehicles are equipped with various sensors to collect data. On the one hand, due to facts such as communication bandwidth limitation, privacy protection and security, it is impractical to transfer data from all vehicles to a central server for centralized data processing and analysis. On the other hand, the limited amount of data collected by an individual vehicle is not feasible to train machine learning models for the large-scale prediction in a city or a state, e.g., a vehicle does not know the traffic conditions at the locations the vehicle has not yet travelled. In addition, the data collected by individual vehicle may contain imperfection that may lead to non-robust model training. Therefore, it is necessary to provide a collaborative machine learning platform by avoiding the local data transfer, considering communication capability, integrating on-board computation resource heterogeneity and local data heterogeneity.

To that end, some embodiments of the invention utilize the distributed machine learning techniques such as federated learning to build robust prediction models for accurate vehicle metrics prediction, wherein a centralized learning server coordinates the distributed model training by considering communication capability, on-board computation resource heterogeneity and local data heterogeneity, and distributes the well-trained machine learning models to the on-road vehicles for their prediction tasks.

Some embodiments are based on the recognition that the multi-round distributed machine learning model training is time consuming. However, due to the high mobility, the time a vehicle connects to a roadside unit (RSU), e.g., a 3GPP C-V2X gNodeB or an IEEE DSRC/WAVE roadside unit, can be short. In other words, it is possible that a vehicle may not have enough time to complete the whole model training process. Therefore, a practical communication network architecture needs to be provided for vehicular distributed machine learning.

Accordingly, some embodiments of the invention provide a hierarchical communication network architecture that includes a set of distributed RSUs to collaboratively relay data traffic between a learning server and a set of learning agents, wherein vehicles act as learning agents. The RSUs form core communication network, in which the RSUs connect to the learning server via reliable communication links such as wired communication link and connect to the on-road vehicles via wireless communication links. This architecture not only increases the coverage area but also extends the connection time between the learning server and the learning agents. The vehicles may associate with different RSUs at different time along the road. The communication between the learning server and vehicle agents is relayed by core communication network. This architecture not only increases the coverage area but also extends the connection time between learning server and learning agent.

To that end, the learning server first selects the vehicle agents, and then distributes the global machine learning models to the selected vehicle agents for the first round of the distributed training Each selected vehicle then trains the received models independently by using its own data without sharing its data with any other vehicle or learning server. After certain iterations of training, each vehicle agent uploads the trained models to the learning server via core communication network. The learning server then aggregates the received models from the selected vehicle agents to build the updated global models. Upon completion of the model aggregation, the learning server selects vehicle agents and re-distributes the aggregated models to the selected vehicle agents for the second round of training. This process of training and aggregation continues until the robust models are built.

Some embodiments are based on the recognition that the downlink/uplink model transmission time, computation resources, model queueing time and data type/size vary from vehicle to vehicle. Therefore, the times vehicle agents receive global model are different. As a result, some vehicle agents have more time to locally train machine learning model and other vehicle agents have less time to locally train machine learning model. Therefore, it is impractical to require all vehicle agents to perform a uniform amount of training work, e.g., running the same number of local iterations.

To that end, some embodiments of the invention allow vehicle agents to perform non-uniform model training such that each agent determine its own number of training iterations and allow the learning server to take partially trained local models such that some vehicle agents train model with more iterations and other vehicle agents train models with less iterations.

Some embodiments are based on the recognition that the learning server and the selected vehicle agents communicate via core communication network, wherein the communication between RSUs and vehicles via unreliable wireless links. Therefore, the global model distribution may not arrive at the vehicle agent and similarly, the local model uploading may not arrive at the learning server. Therefore, a time threshold needs to be defined so that the learning server does not wait for the local models for ever.

To that end, some embodiments of the invention define a time threshold for each global training round of the distributed model training such that the time difference from the time the learning server transmitting the global models to the vehicle agents to the time the learning server receiving local models from the vehicle agents must be less than this specified threshold. If the learning server does not receive the local models from some vehicle agents by this time threshold, the learning server aggregates models without waiting for the un-received local models.

Accordingly, the total time consists of global model queuing time, global model transmission time, local model training time, local model queuing time and local model transmission time. The global model queuing time is the time global model stays in RSU's transmission queue before transmission. The global model transmission time includes time to transmit global model from the learning server to RSUs plus time to transmit global model from RSUs to vehicle agents. The local model training time is the time needed to locally train model. It depends on vehicle agent's resources including processor power, amount of the local data, etc. The local model queuing time is the time the trained local model queued in vehicle agent's transmission queue before transmission by assuming no queuing at RSUs due to high-speed communication link between RSUs and the learning server. The local model transmission times is time to transmit local model from vehicle agents to RSUs plus time to transmit local model from RSUs to the learning server.

Some embodiments are based on the recognition that the model queueing time and the model transmission time are overhead that need to be minimized so that the vehicle agents have more time for model training.

To that end, some embodiments of the invention eliminate the downlink model queueing time by multicasting the global model. Each RSU solves a multicast beamforming problem to maximize the data rate for global model distribution in the downlink. To upload the locally trained models, each RSU solves a complex combinatorial problem to allocate optimal radio resources to the learning agents. The optimal resource allocation minimizes the model transmission time. Accordingly, the distributed machine learning is formulated as an optimization problem.

Some embodiments are based on the recognition that data collected by vehicles depend on location, time, weather, road condition, special event, etc. At same location, traffic condition varies based on different time, different weather, etc. Rush hour traffic condition is different from off hour traffic condition. Snow day traffic condition is different from sunny day traffic condition.

To that end, it is desirable that vehicle agents divide their data into different clusters based on collection location, time, weather, etc. As a result, vehicle agents train different models by using different data clusters. Vehicle agents do not train models for which they do not have appropriate data. Therefore, vehicle agents only upload trained models to the learning server.

Accordingly, the learning server build global models by aggregating the locally trained models by considering information including location, time, weather, etc.

Some embodiments are based on the recognition that the VSP is the power demand by the engine during driving. It is used to calculate the fuel consumption and the correspondent emissions. Therefore, the VSP prediction is important.

Accordingly, some embodiments of the current invention provide multi-horizon VSP prediction. A prediction time horizon consists of multiple prediction periods. Even the longer time horizon provides more predictions, the shorter time horizon makes more accurate predictions.

Some embodiments are based on the recognition that there are uncertainties in vehicular environment. Therefore, machine learning models must be trained to handle unexpected events such as traffic accident captured by the on-road vehicles.

Accordingly, the learning server and vehicles can interact with each other for model enhancement.

According to some embodiments of the present invention, a computer-implemented method is provided for training a global machine learning model using a learning server and a set of vehicle agents connected to roadside units (RSUs), wherein the method uses a processor coupled with a memory storing instructions implementing the method, wherein the instructions, when executed by the processor, carry out at steps of the method, comprising: selecting vehicle agents from a pool of the vehicle agents connected to the RSUs, wherein the vehicle agents include on-board computer units and on-board sensors configured to collect local datasets through trajectories of the selected vehicle agents on roads; associating the selected vehicle agents and the RSUs respectively based on distances from the selected vehicle agents to the RSUs configured to provide measurements of the distances to the learning server; transmitting a global model $w_k$, a selected agent set $V_k$ and deadline thresholds $d^{cmp}$ and deadline thresholds $d^{thr}$ in each global training round k to the RSUs configured to transmit the global model $w_k$ and training deadlines $d_v^{cmp}$ to the selected vehicle agents, wherein the associated RSUs compute the training deadlines $d_v^{cmp}$ of the corresponding selected vehicle agents, wherein the selected vehicle agents locally train the global model $w_k$ independently using the local datasets collected by the on-board sensors of the selected vehicle agents to generate locally trained models; and aggregating the locally trained models from the selected vehicle agents via the associated RSUs to update the global model until the global model reaches an expected level of precision.

Further, some embodiments of the present invention provide a computer-implemented communication method for causing a learning server to update a global model by providing locally trained models from vehicle agents selected by the learning server. The method uses a processor coupled with a memory storing instructions implementing the method, wherein the instructions, when executed by the processor carry out at steps of the method, including:
acquiring information on associated vehicle agents, a global model $w_k$ and deadline thresholds $d^{cmp}$ and $d^{thr}$ from the learning server; optimizing downlink model distribution delay $d_v^{down}$ by maximizing data rate for the associated vehicle agents via solving following multicast beamforming optimization problem $$\underset{G_{b,z}, \forall z \in Z_b, \forall v \in V_k^b}{\text{maximize min}} \quad Tr(G_{b,z} H_{b,z}^v),$$
$$\text{subject to:} \quad Tr(G_{b,z}) = 1, \; G_{b,z} \succeq 0$$

computing downlink communication delays $d_v^{down}$ for the associated vehicle agents, wherein respective training deadlines $d_v^{cmp}$ of the associated vehicle agents are determined based on the deadline threshold $d^{cmp}$ and the downlink communication delays $d_v^{down}$ for the associated vehicle agents; multicasting the global model and the training deadlines $d_v^{down}$ to the associated vehicle agents; allocating optimal uplink resources, in response requests from the associated vehicle agents that have trained global model at the training deadlines based on the training data collected by on-board sensors of the associated vehicle agents to generate locally trained models, to allow the associated vehicle agents upload the locally trained models with the minimal delays $d_v^{up}$ by solving following combinatorial optimization problem $$\underset{\mathbb{I}_{b,z}^v, \forall v \in V_k^b}{\text{maximize}} \quad \omega \sum_{z_b=1}^{Z_b} \mathbb{I}_{b,z}^v \cdot \log_2\left(1 + \Gamma_{b,z}^{v,up}\right),$$
$$\text{subject to} \quad \sum_{z_b=1}^{Z_b} \mathbb{I}_{b,z}^v = 1,$$
$$\sum_{v \in V_k^b} \mathbb{I}_{b,z}^v = 1,$$
$$\sum_{z_b=1}^{Z_b} \sum_{v \in V_k^b} \mathbb{I}_{b,z}^v = |Z_b|$$

and receiving and transmitting the locally trained models uploaded from the associated vehicle agents to the learning server.

Yet further, according to some embodiments of the present invention, a communication and computation aware distributed machine learning system is provided for vehicular networks including a learning server communicating with a set of roadside units (RSUs) and on-road vehicles to train a global machine learning model in distributed fashion, wherein the system includes a processor coupled with a memory storing instructions implementing a method. In this case the instructions, when executed by the processor, carry out at steps of the method, include: selecting a set of on-road vehicles as learning agents from the on-road vehicles; determining a training deadline threshold to finish training local model by the learning agents; determining an upload deadline threshold to finish uploading the locally trained model by the learning agents; associating, to provide continuous connection between the learning server and the learning agents, the learning agents with the RSUs based on one or combination of methods of (1) randomly selecting vehicle agents, (2) selecting vehicles that keep connecting to the associated RSUs for longer, (3) selecting vehicles that have better link quality to their associated RSUs, (4) selecting vehicles that had better performance in previous training round, (5) selecting vehicles that have larger datasets, and (6) selecting vehicles that have more commutation resources; distributing a global machine learning model to the selected learning agents via the associated RSUs by performing downlink multicast beamforming to minimize global machine learning model distribution delay using the associated RSUs, wherein the learning agents including on-board processing units collect local data along roads using on-board sensors and cluster the collected local data based on vehicular environment of the learning agents, wherein each of the learning agents determines local model training iterations based computation power and data sizes to satisfy a summation of the training and upload deadline thresholds, wherein each of the learning agents trains the global machine learning model locally using the collected local data for the determined local model training iterations, the learning agents reporting channel measurements to the associated RSUs and adjacent unassociated RSUs for performing a best handover from the currently associated RSUs; allocating optimal uplink radio resources of physical resource blocks (pRBs) of the associated RSUs to the associated learning agents to minimize local model uploading delay and queuing delay of the learning agents; and aggregating the locally trained models received from the selected vehicle agents via the allocated optimal uplink radio resources of the RSUs to update the global model.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 6 shows algorithm to optimally allocate radio resource to associated vehicles, according to some embodiments of the present invention;

FIG. 7 shows algorithm to associate vehicles and roadside units, according to some embodiments of the present invention;

FIG. 8 illustrate the vehicular federated learning (FL) algorithm, according to some embodiments of the present invention;

DETAILED DESCRIPTION OF THE PREFERRED EMBODIMENTS

Figure 1:
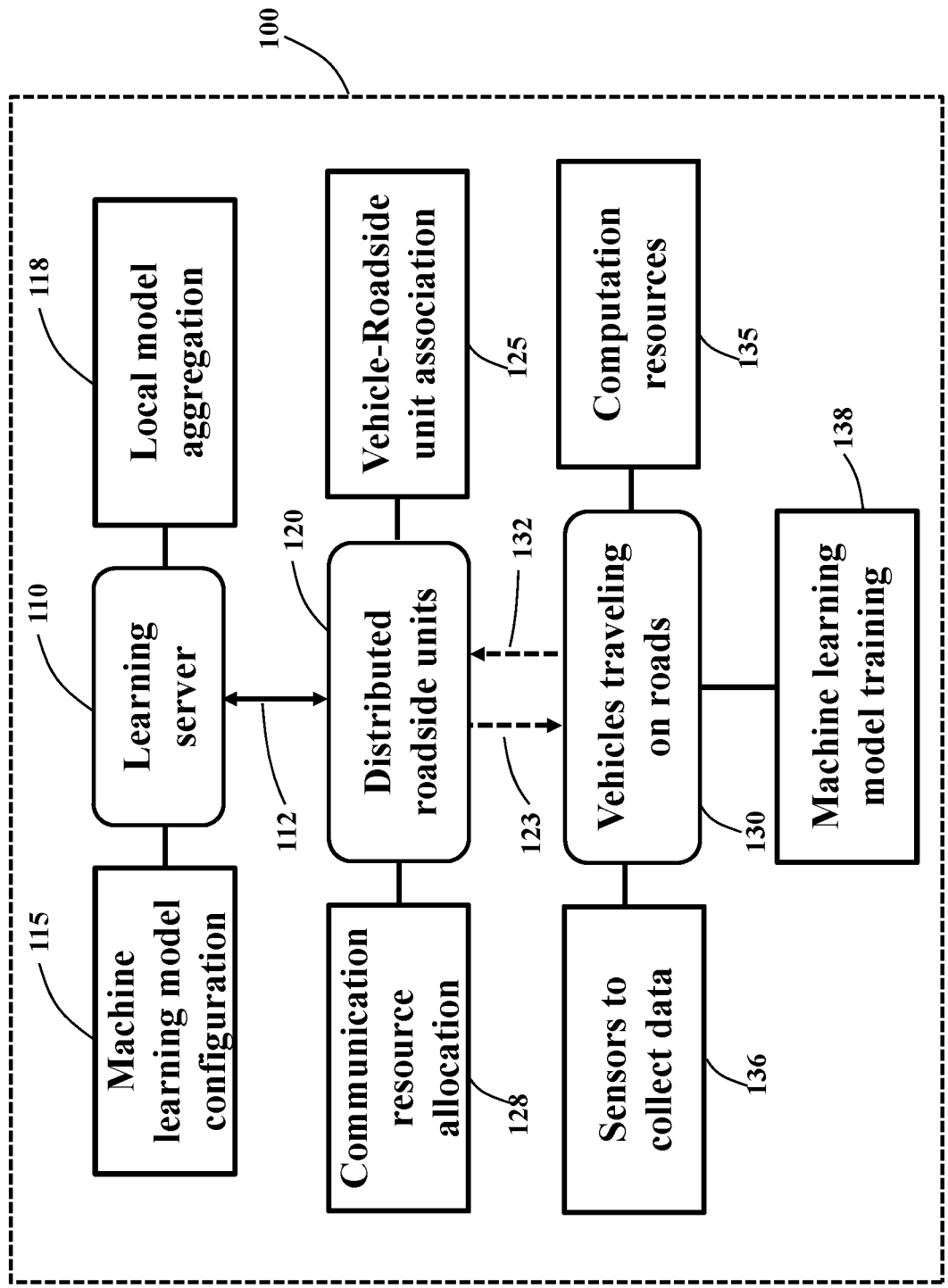
FIG. 1 shows the communication-computation aware distributed learning platform for vehicular networks, according to some embodiments of the present invention.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Modern vehicles are packed with various on-board sensors to sense diversified data for fulfilling higher automation levels. To facilitate the development of automated and autonomous vehicles, it is imperative to have an accurate metric prediction. This is due to the fact that, such knowledge can help drivers make effective travel decisions so as to mitigate the traffic congestion, increase the fuel efficiency, and alleviate the air pollution. These promising benefits enable the vehicle metric prediction to play major roles in the advanced driver-assistance system (ADAS), the advanced traffic management system, and the commercial vehicle operation that the intelligent transportation system (ITS) targets to achieve.

The machine learning (ML) techniques can be used for prediction tasks in vehicular networks. For example, a stacked autoencoder model can be used to learn the generic traffic flow features for the predictions. The long short-term memory (LSTM) recurrent neural network (RNN) can be used to predict the traffic flow. Along with the use of RNN, the convolution neural network (CNN) can also be utilized to capture the latent traffic patterns within the underlying road network.

Although the prior arts focus on using advanced deep learning models for the vehicular traffic prediction, all of them study the traffic variations using an independent learning model. Due to the varying weather, changing road conditions and special events, the on-road traffic patterns can vary significantly under different situations. Hence, using an independent model is not able to capture such diverse and complex traffic situations. Most important, the data collected by individual vehicles may be non-IID (independent and identically distributed) and contain imperfections. Training independent ML model solely on individual vehicle data may lead to non-robust model training. However, transferring the data to a central server raises the privacy concern and increases communication cost. Therefore, it is necessary to provide a collaborative machine learning architecture by avoiding data transfer, considering communication efficiency, integrating on-board computation resource and local data heterogeneity.

The privacy-preserving distributed machine learning such as federated learning (FL) can provide a solution. FL is an advanced ML technique that allows training ML models locally based on the trainer's local data. Therefore, it ensures user privacy protection and can also effectively reduce the communication overhead. Most importantly, FL can incorporate data features in collaborative heterogeneous datasets, which allows robust traffic model training by eliminating data imperfection contained in individual dataset.

FIG. 1 shows the communication-computation aware distributed learning platform 100 for vehicular networks and its components as well as the interactions among the components according to some embodiments of the current invention. The platform 100 includes the learning servers 110, distributed roadside units 120, and on-road vehicles 130 that are the learning agents. In this case, the learning server 110 is connected to the distributed roadside units 120 via high speed reliable communication links 112. The learning servers 110 can be located remotely or along roadside. The learning servers 110 select machine learning models 115 named as global models and aggregate the locally trained models 118. Learning servers 110 distribute the global models to the selected on-road vehicles for training. The distributed roadside units (RSUs) 120 form core communication networks, associate (connect) on-road vehicles 125 for service providing and allocate communication resources 128 to the vehicles. Most importantly, RSUs relay communication traffic between learning servers and vehicles. On-road vehicles 130 use their sensors to collect data 136, train machine learning models 138 using their computation resources 135 and local data, and upload locally trained models to the learning servers to build global models. Learning servers 110 distribute the well-trained machine learning models to on-road vehicles 130 via the distributed RSUs 120 for their prediction tasks such as velocity prediction and vehicle-specific power prediction. In this case, the on-road vehicles 130 and the distributed RSUs 120 communicate wirelessly using downlink communication links 123 and uplink communication links 132.

Figure 2:
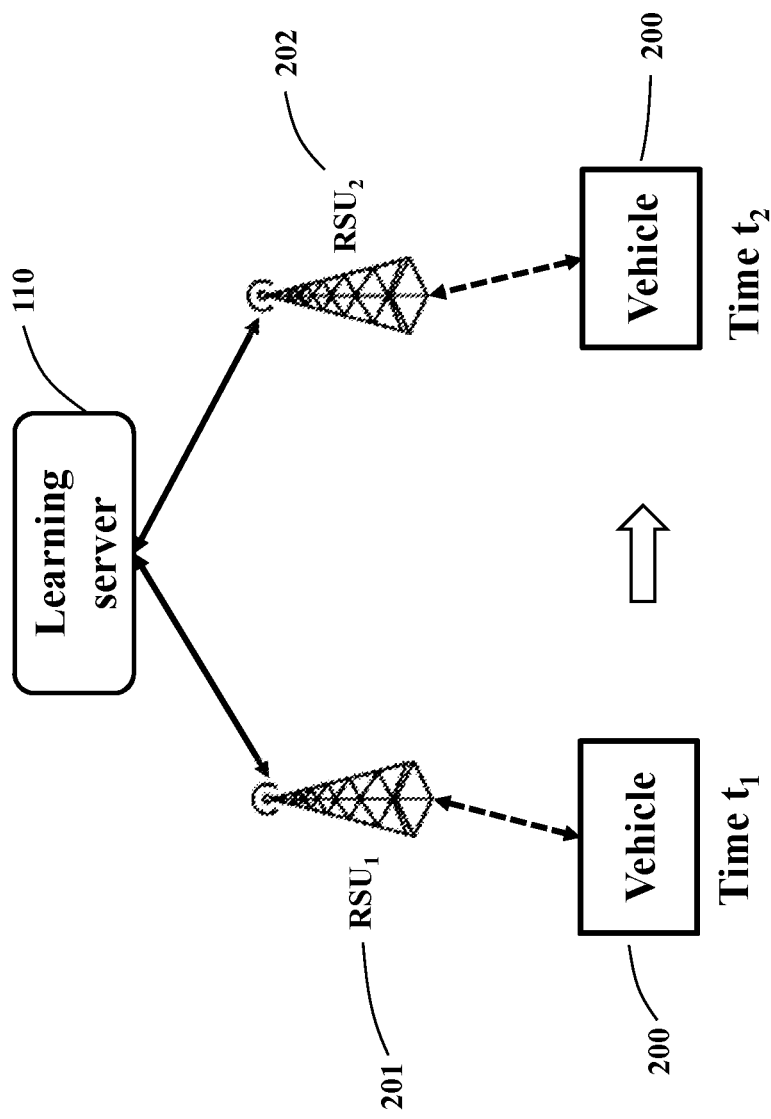
FIG. 2 shows an example of the on-road vehicle association with the roadside units (RSUs) as the vehicle travels along the road, according to some embodiments of the present invention.

Unlike conventional mobile devices such as smart phones, vehicles are with high mobility and can quickly switch connection points from time to time. FIG. 2 shows an example of the on-road vehicle connection with the RSUs as the vehicles travel along the road, in which $RSU_1$ 201 and $RSU_2$ 202 connect to the learning server 110 with high speed wired links. An on-road vehicle 200 connects to $RSU_1$ at time $t_1$ and connects to $RSU_2$ at time $t_2$.

Figure 3A:
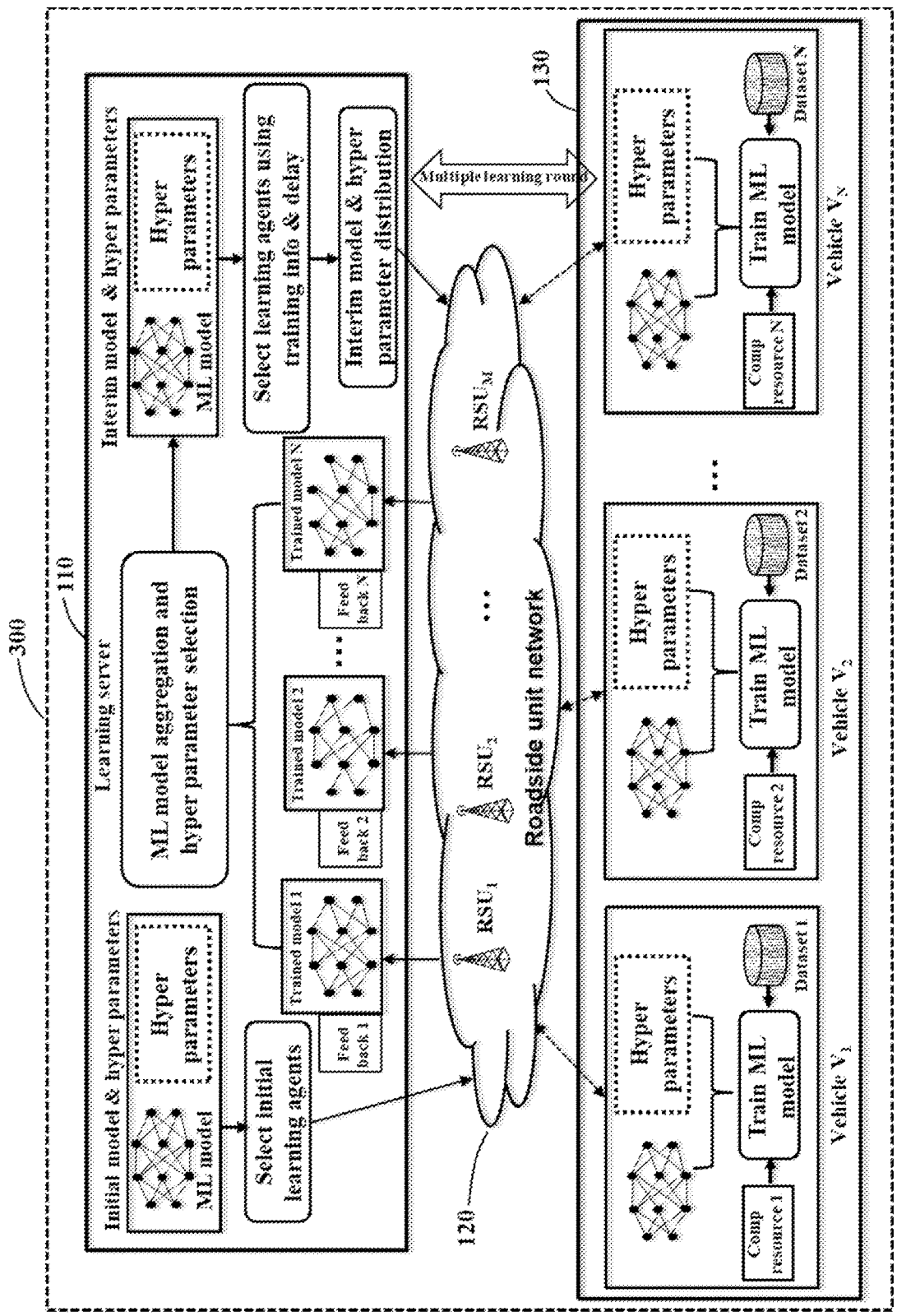
FIG. 3A illustrates the two-tier communication-computation aware distributed machine learning architecture, according to some embodiments of the present invention.

To address such short connection issue, the embodiments of the present invention provides a two-tier communication-computation aware distributed machine learning architecture 300 as shown in FIG. 3A illustrating the two-tier communication-computation aware distributed machine learning architecture, where the learning server selects initial ML models such as neural networks and hypermeters such as time threshold to finish local training and time threshold to upload locally trained models, selects initial learning agents to train the models and distributes ML models and hyperparameters via RSUs to selected vehicle agents for training. As training round starts, the learning server receives locally trained models and feedback such as number of local training iteration and communication link quality from the learning agents. The learning server then aggregates the received local models using method such as averaging and selects hyperparameters for next round of training. The learning server then selects learning agents and distributes the interim models and hyperparameters to the agents for training. In each round of training, the selected vehicle agents determine their local training iterations based on hyperparameters, their computation resources and their local data sizes, and then train models for the determined number of iterations using their local datasets. Upon finishing local training, the learning agents upload the trained models to the learning server via RSUs.

Figure 3B:
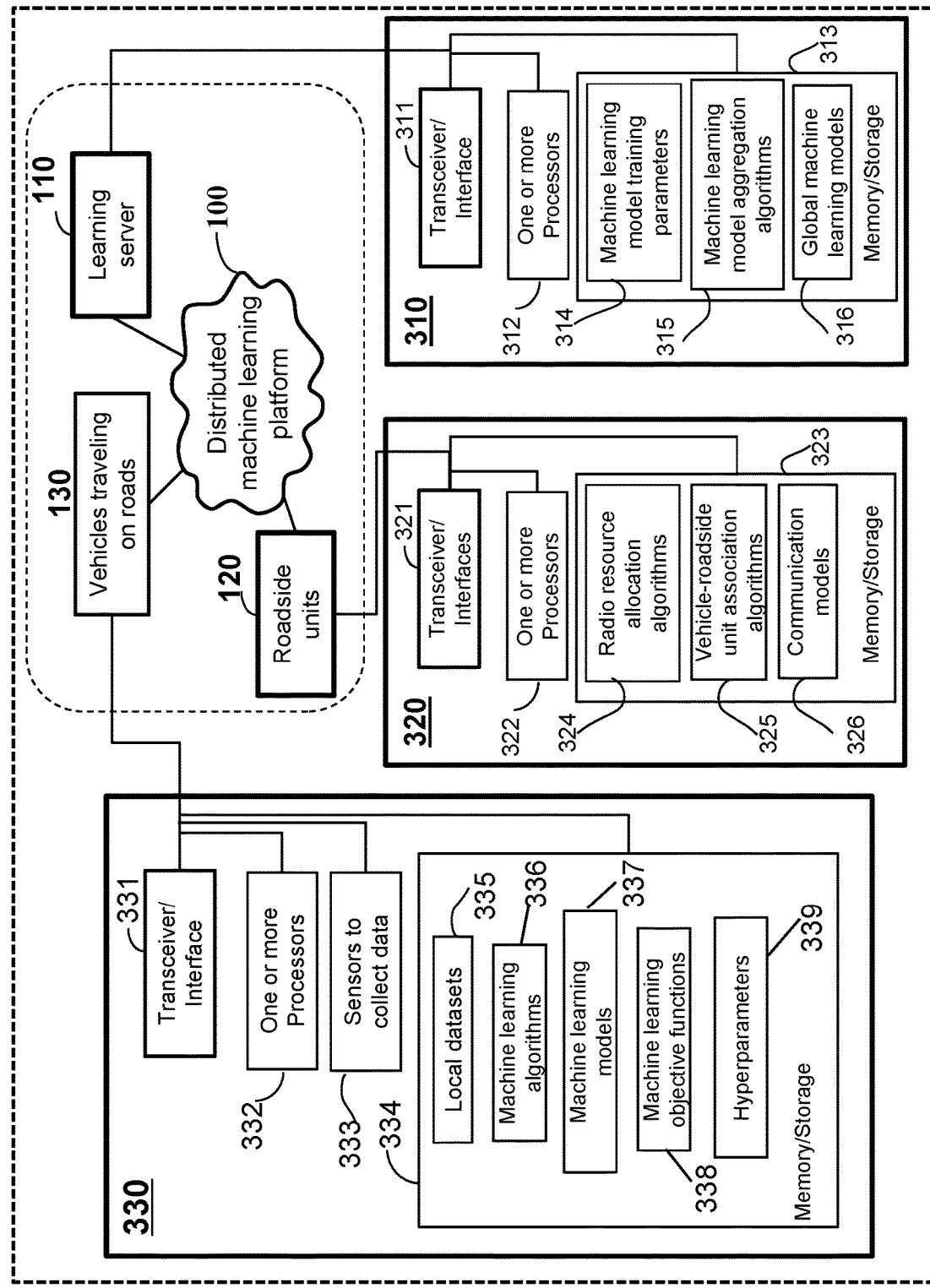
FIG. 3B shows an example of functional components of the learning server, roadside units and vehicle agent in the distributed machine learning platform, according to embodiments of the present invention.

FIG. 3B shows an example of functional components 310, 320 and 330 of the learning server, roadside units and vehicle agents, respectively, in a distributed machine learning platform 100. The learning server 110 may include an interface (or transceiver) 311 configured to communicate with the learning agents 130 via the RSUs 120, one or more processors 312, and a memory/storage 313 configured to store hyperparameters 314, model aggregation algorithm 315 and global machine learning model 316. A RSU 120 may include two interfaces (or transceivers) 321 configured to communicate with the learning server 110 via high speed reliable links and with vehicles 130 via wireless links, one or more processors 322, and a memory/storage 323 configured to store radio resource allocation algorithm 324, vehicle-RSU association algorithms 325, and communication algorithms 326. A vehicle 130 may include an interface (or transceiver) 331 configured to communicate with the learning server 110 via RSUs 120 via wireless links, one or more processors 332, sensors 333, and a memory/storage 334 configured to store local data 335, machine learning algorithms 336, machine learning models 337, machine learning objective functions 338, and hyperparameters 339.

Figure 4:
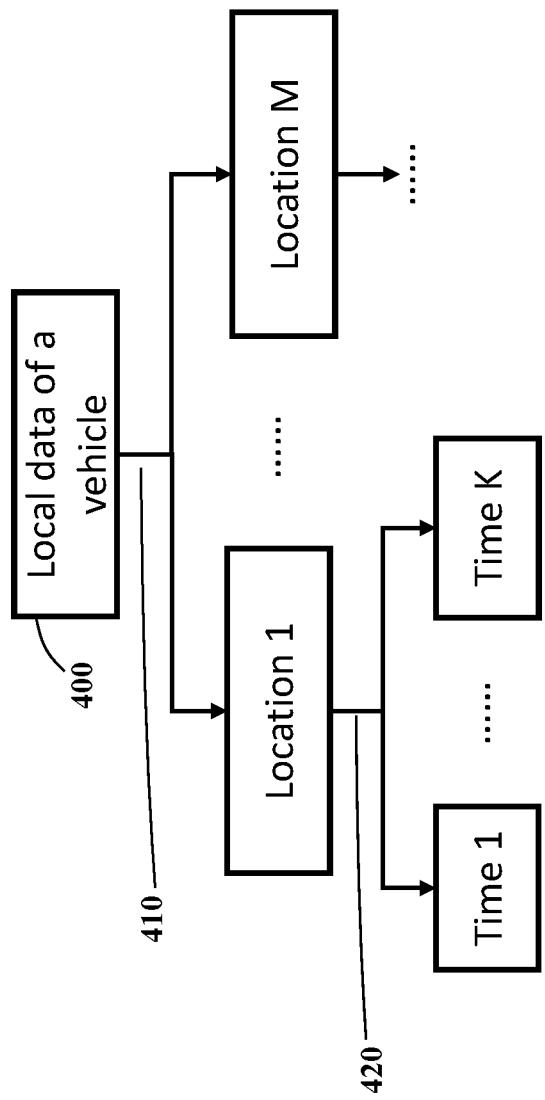
FIG. 4 shows an example of data clustering method that is used to divide data at each on-road vehicle into clusters, according to some embodiments of the present invention.

To facilitate the distributed machine learning, the training data of the learning agents can be partitioned into different clusters such that each cluster corresponds to a learning model, e.g., rush hour data are used to train the rush hour model. Data clustering is important for many reasons, e.g., off hour data is not desirable to train rush hour traffic model, local traffic data is not suitable to train freeway traffic model. There are different ways to cluster data. FIG. 4 illustrates a data clustering method used to divide data at each on-road vehicle into clusters, where local data 400 of a vehicle is first divided 410 based on locations, and then divided further 420 based time.

System Model and Downlink/Uplink Communication Model

Denote the vehicle set and the RSU set by $\mathcal{V} = \{v\}_{v=1}^{V}$ and $\mathcal{B} = \{b\}_{b=1}^{B}$, respectively. The learning server first selects vehicle agents and distributes a global model, parameterized by its weight w, to the selected agents. Upon receiving w, a vehicle agent v trains the received model using its local data and uploads the trained model weight $w^{(v)}$ to the learning server. The learning server then aggregates all agents' local models to build an updated global model. The training process continues until the global model reaches an expected level of precision. In some cases, the expected level of precision can be defined by a pre-determined number of global training rounds (a pre-determined threshold or a global training threshold), where the pre-determined number may be an integer $R_t > 0$. The global training threshold can be automatically set by the learning server based on time or training feedback of the selected vehicle agents on roads, e.g., training loss. Accordingly, updating the global model by aggregating all agents' local models continues until the global training round k reaches the global training threshold.

To perform such distributed model training in a vehicular environment, an efficient I2V/V2I communication platform is needed for sharing w and $w^{(v)}$s. Therefore, a practical dense heterogeneous network architecture is provided, where multiple RSUs are deployed over a considered region of interest (RoI) to connect vehicles. These RSUs are connected to a learning server with high-speed reliable communication links. The vehicles travel on the roads and get connected to the learning server via these RSUs as shown in FIG. 1. The motivation for adopting this architecture is three-folded. Firstly, the on-board computation power of vehicles is limited. It may take a long time to finish the local model training. Therefore, vehicles may move away from the RSUs they received the global model from the learning server. This two-tier atchitecture enables vehicles to be covered by other RSUs when they finish model training. Secondly, it aims to ensure V2I/I2V connectivity in a larger area for comprehensive observations and robust model training. Thirdly, it may not be possible to establish direct vehicle-server communication links due to the limited coverage of wireless links.

Figure 5:
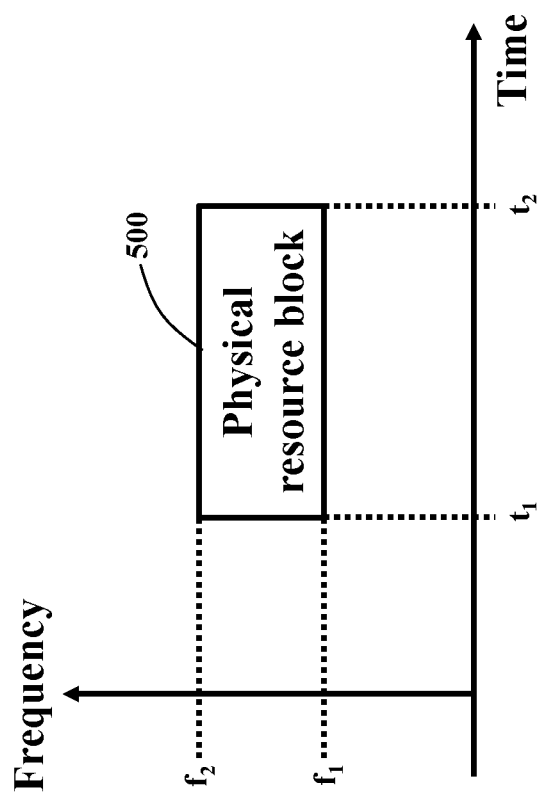
FIG. 5 depicts the two-dimensional physical resource block in 3GPP C-V2X communication network, according to some embodiments of the present invention.

Due to high-speed reliable links between the learning server and RSUs, the server-RSU communication delay is negligible. Let the total network bandwidth, for the vehicle-RSU communications, be $\Omega$ Hz. The radio resource is divided to the RSUs so that the consecutive RSUs have independent radio resources. The resources can be reused by RSUs that are far away from each other. Furthermore, the radio resource is divided into orthogonal physical resource blocks (pRBs) as shown in FIG. 5 illustrating the two-dimensional physical resource block in 3GPP C-V2X communication network, where a pRB 500 is a two dimensional block in frequency domain and time domain. Denote the radio resource of RSU b by $\Omega_b$ and denote the pRB set of b by $$\mathcal{Z}_b = \{z_b\}_{z_b=1}^{Z_b}.$$

Assume all pRBs have the same size $\omega$. Assume each vehicle has a single antenna, while each RSU b has $n_b$ antennas.

The vehicle-RSU network operates in time division duplex (TDD) mode and can exploit channel reciprocity. The channel is assumed to be quasi-static block fading, i.e., it remains static within a block but varies across different blocks. Denote the wireless channel between the RSU b and vehicle v over pRB $z_b$ by $h_{b,z}^v \in \mathbb{C}^{n_b \times 1}$. Moreover, the channel is modeled as $h_{b,z}^v = \sqrt{\zeta_b^v} \tau_b^v \tilde{h}_{b,z}^v$, where $\sqrt{\zeta_b^v}$, $\tau_b^v$, and $\tilde{h}_{b,z}^v$ are large scale fading, log-Normal shadowing, and small scale fading channel response, respectively.

In 3GPP communications, the RSUs can be connected with each other via the $X_n$ interface. In addition, assume each vehicle calculates the reference signal received powers (RSRPs) from its serving RSU and adjacent RSUs. Once the A3 event is triggered, the vehicle reports the measurements to the serving RSU. The serving RSU then handovers the vehicle to the target RSU. As such, a vehicle is always associated with only one RSU, i.e., $$\sum_{b=1}^{B} a_v^b = 1, \forall v \in \mathcal{V},$$

where $a_v^b \in \{0,1\}$ is an indicator function that takes value 1 when vehicle v is associated to RSU b.

Downlink Communication Model

In the downlink, as a RSU transmits the same global model to all of its associated agents, each RSU b can multicasts the ML model w. Assume that each RSU has fixed pRBs to multicast the ML model. Denote the downlink multicast beamforming vector of RSU b over pRB $z_b$ by $g_b^z \in \mathbb{C}^{n_b \times 1}$. Then, the received signal at vehicle v over pRB $z_b$ is expressed as $$y_{b,z}^{v,dn} = \sqrt{P_b^z} a_v^b (h_{b,z}^v)^H g_b^z s_b^z + \eta, \qquad (1)$$

where $P_b^z$ is b's transmission power over pRB $z_b$, $s_b^v$ is the unit power transmitted data symbol of b intended for vehicle v and $(x)^H$ denotes the conjugate transpose. Moreover, $\eta \sim CN(0, \sigma^2)$ is the circularly symmetric complex Gaussian noise with zero mean and variance $\sigma^2$.

To this end, the downlink signal-to-noise ratio (SNR) over pRB $z_b$ is calculated as follows:

$$\Gamma_{b,z}^{v,dn} = P_b^z |(h_{b,z}^v)^H g_b^z|^2 / \omega \sigma^2. \qquad (2)$$

When the global model is distributed from the learning server, the downlink data rate at vehicle v from RSU b, over all pRB $z_b \in \mathcal{Z}_b$, is calculated as $$C_v^{dn} = a_v^b \cdot \omega \sum_{z_b=1}^{Z_b} \mathbb{E}_h[\log_2(1 + \Gamma_{b,z}^{v,dn})], \qquad (3)$$

where $\mathbb{E}_h[\cdot]$ is the expectation over $h_{b,z}^v$.

Uplink Communication Model

For the uplink, assuming linear receiver vector $g_{v,z}^b \in \mathbb{C}^{1 \times n_b}$, the effective received signal at RSU b from vehicle v is calculated as $$y_{v,u}^{b,up} = \sqrt{P_v^b} a_v^b h_{v,z}^b (g_{v,z}^b)^H s_v^b + \eta, \qquad (4)$$

where $P_v^b$ is the uplink transmission power of vehicle v and $s_v^b$ is the intended uplink transmitted symbol of v. Moreover, this gives the following uplink SNR $$\Gamma_{b,z}^{v,up} = P_v^b a_v^b |h_{v,z}^b (g_{v,z}^b)^H|^2 / \omega \sigma^2. \qquad (5)$$

Similar to $C_v^{dn}$, the uplink data rate is calculated as $$C_v^{up} = a_v^b \cdot \omega \sum_{z_b=1}^{Z_b} \mathbb{I}_{b,z}^v \cdot \mathbb{E}_{\hat{n}}[\log_2(1 + \Gamma_{b,z}^{v,up})], \quad (6)$$

where $\mathbb{I}_{b,z}^v \in \{0,1\}$ is an indicator function that takes value 1 when $z_b \in \mathcal{Z}_b$ is assigned to vehicle v.

2. Communication and Computation Aware Distributed Machine Learning with Delay Constraint The present invention provides an extend the FedProx based distributed machine learning to incorporate communication delay, queuing delay, model training delay and dataset heterogeneity in vehicular networks.

Without loss of generality, denote the data sensing interval of the vehicles by $\Delta t$. Denote vehicle v's dataset at time t by $\mathcal{D}_v^t = \{x_v^i, y_v^i\}_{i=1}^t$, where $x_v^i$ and $y_v^i$ are the $i^{th}$ feature set and corresponding label, respectively. The entire dataset available at time t is denoted as $\mathcal{D}^t = \cup_{v=1}^V \mathcal{D}_v^t$. As the central server does not have access to dataset $\mathcal{D}^t$, it aims to solve following optimization problem:

$$i. \quad \underset{w}{\text{minimize}} \quad f(w) = \mathbb{E}_{v}^*[f_v(w)] = \sum_{v=1}^V p_v \cdot f_v(w), \quad (7)$$
$$\text{s.t. } w^{(1)} = w^{(2)}, \ldots, = w^{(V)} = w,$$

where w is the global model parameters, $f_v(w) \mathbb{E}_{\{x_v^i, y_v^i\} \sim \mathcal{D}_v^t}[f_v(\{x_v^i, y_v^i\}, w)]$ is the local empirical risk function for agent v and $\Sigma_{v=1}^V p_v = 1$ with the probability $p_k = |\mathcal{D}_v^t|/|\mathcal{D}^t|$. This FedAvg based federated learning (FL) works well when the agents have IID data distribution and homogeneous computation power. In vehicle learning case, the vehicle agents have (a) diverse on-board sensors that lead to non-IID data distribution and (b) heterogeneous on-board computation power. Therefore, FedProx based FL is more suitable because it is designed for agents with different computation resources. Accordingly, FedProx accepts partial works of the stragglers while each agent tends to solve its local optimization problem inexactly.

At the beginning of a global round denoted by k, the learning server selects a set of vehicle agents from the vehicle pool. Denote the selected agent set by $\mathcal{V}_k \subseteq \mathcal{V}$. Each agent $v \in \mathcal{V}_k$ then receives the global model $w_k$ and perform local model training to minimize the following objective function $$\tilde{f}_v(w; w_k) = f_v(w) + \frac{\mu}{2} \|w - w_k\|^2, \quad (8)$$

where the proximal term is added to control heterogeneity, $\mu \geq 0$ is the penalty parameter, $d_v^{tot}$ is total delay at vehicle v and $d^{thr}$ is time threshold for all agents to finishing local model training and uploading the local models to the learning server, $d_v^{tot}$ and $d^{thr}$ will be described later.

Each agent $v \in \mathcal{V}_k$ solves problem (8) $\gamma_v^k$-inexactly for solution $w_k^{(v,*)}$ such that $\|\nabla \tilde{f}_v(w_k^{(v,*)}; w_k)\| \leq \gamma_v^k \|\nabla \tilde{f}_v(w_k; w_k)\|$. The parameter $\gamma_v^k$ defines how much local computation to be performed by agent v for solving its respective local subproblem. In vehicular environment, FedProx method is particularly helpful for heterogeneous computation power and datasets of vehicle agents.

Upon receiving $w_k^{(v,*)}$s from all learning agents, the central server then averages these models to obtain $w_{k+1}$. The algorithms to solve problem (8) will be explicitly introduced later.

Delays in Distributed Vehicular Machine Learning

Downlink model distribution delay, local model training delay, local mode uploading delay and uplink queuing delay are considered.

1) Model transmission delay: With vehicle agents, only model transmission time at wireless links is considered. The downlink and uplink delays are calculated based on downlink data rate $C_v^{dn}$, uplink data rate $C_v^{up}$ and payload size. Assuming the FL model parameter is d-dimensional, the required number of bits is $S = \Sigma_{i=1}^d FPP_i$, where $FPP_i$ represents the floating point precision for element i. As such, at the beginning of a global round, the model distribution time to agent v via RSU-vehicle downlink communication is calculated as:

$$ii. d_v^{down} = \kappa \times \min\left\{T : \kappa \times \left(\sum_{\bar{t}=1}^T C_v^{dn}(\bar{t})\right) \geq S, T \in \mathbb{Z}^+\right\}, \quad (9)$$

where $\kappa$ is the transmission time interval (TTI) and $C_v^{dn}(\bar{t})$ is the achievable downlink capacity based on the channel realization at slot $\bar{t}$.

Similarly, the time to upload agent v's trained model is calculated as:

$$i. d_v^{up} = \kappa \times \min\left\{T : \kappa \times \left(\sum_{\bar{t}=1}^T C_v^{up}(\bar{t})\right) \geq S, T \in \mathbb{Z}^+\right\}, \quad (10)$$

where $C_v^{up}(\bar{t})$ is the achievable uplink capacity based on the channel realization at slot $\bar{t}$.

2) Local model training delay: Recall that the vehicles have heterogeneous on-board processing unit power. Denote agent v's processing power by $\rho_v$ cycles per second. If per sample data requires $\eta_v$ cycles for processing, then the time for one iteration model training is $d_v^{itr} = [(\eta_v | \mathcal{D}_v|)]/\rho_v$. Assume agent v trains model for $L_v$ iterations. Total training time is $L_v * d_v^{itr}$.

3) Queueing delay: Queuing delay is the waiting time of a vehicle agent before being scheduled by the associated RSU. It can be an important delay contributor in wireless networks. Since the RSUs multicast global model in the downlink, there is no downlink queuing delay. Therefore, the present invention only considers uplink queuing delay. Denote the uplink queuing time of agent v by $d_v^{q,up}$, which is the time difference from the time agent v finishes local model training to the time agent v is scheduled to upload the trained model.

Delay Constraint for the Distributed Learning in Vehicular Networks

The total delay for agent v is calculated as:

$$d_v^{tot} = d_v^{down} + d_v^{cmp} + d_v^{q,up} + d_v^{up}. \quad (11)$$

The learning server sets a time threshold denoted as $d^{thr}$ in each global training round, by which the learning server needs to distribute the global model, agents need to locally train model and upload the trained models back to the learning server. In other words, the constraint $$d_v^{tot} \leq d^{thr}, v \in \mathcal{V}_k \quad (12)$$

must hold.

To satisfy this constraint, the central server, RSUs and vehicle agents collaborate to make the deadline threshold $d^{thr}$ in each global training round. The server selects the time threshold $d^{cmp} < d^{thr}$ for all agents to finish local training. The global training round starts with global model distribution time $t^{dis}$, i.e., the time RSUs receive model w, agent set $\mathcal{V}_k$, threshold $d^{thr}$ and time $d^{cmp}$. At the time $t^{dis}$, the associated RSU computes downlink communication time $d_v^{down}$ for each of its agents and multicasts model w along with a list of $\{v:d^{cmp}-d_v^{down}\}$ to its agents. Upon receiving the global model w and fetching its corresponding $d^{cmp}-d_v^{down}$, the vehicle agent v computes the local training iterations $L_v$ based on its on-board computation power $\rho_v$ and dataset $D_v$ to finish local training by deadline $d^{cmp}$. Upon the expiration of local training threshold $d^{cmp}$, the associated RSU allocates the pRBs to its agents for locally trained model uploading within the remaining $d^{thr}-d^{cmp}$ time period. To do so, agent v coordinates with associated RSU to compute $d_v^{q,up}$ and $d_v^{up}$ to make sure $(d^{thr}-d^{cmp})-d_v^{q,up}-d_v^{up} \geq 0$, i.e., $d_v^{tot} \leq d^{thr}$.

3. Communication-Computation Aware Distributed Learning Solutions

The goal is to ensure constraint (12) hold and minimize model transmission time and queuing time for more model training time in each global training round.

Model Distribution Delay Optimization

To optimize the downlink model distribution delay, each RSU aims to maximize the minimum data rate for all of its associated agents. As such, each RSU finds the downlink multicasting beamforming vector $g_b^z$ for all pRBs by solving the following optimization problem:

$$\underset{g_b^z, \forall z \in \mathcal{Z}_b}{\text{maximize}} \min_{\forall v \in \mathcal{V}_k^b} |(h_{b,z}^v)^H g_b^z|^2, \quad (13)$$

$$\text{subject to: } \|g_b^z\|^2 \leq 1,$$

where $\mathcal{V}_k^b \subseteq \mathcal{V}_k$ is set of agents associated with RSU b in global training round k.

This is a classical multicasting beamforming problem. Note that $|(h_{b,z}^v)^H g_b^z|^2 = \text{Tr}(g_b^z g_b^{z\,H} h_{b,z}^v (h_{b,z}^v)^H)$. Denote $H_{b,z}^v = h_{b,z}^v (h_{b,z}^v)^H$ and $G_{b,z} = g_b^z (g_b^z)^H$. Then, problem (13) can be reformulated as follows:

$$\underset{G_{b,z}, \forall z \in \mathcal{Z}_b}{\text{maximize}} \min_{\forall v \in \mathcal{V}_k^b} \text{Tr}(G_{b,z} H_{b,z}^v), \quad (14)$$

$$\text{subject to: } \text{Tr}(G_{b,z}) = 1, G_{b,z} \succeq 0, \text{rank}(G_{b,z}) = 1.$$

Note that (14) is non-convex due to the rank($G_{b,z}$)=1 constraint. We can relax this constraint to obtain the following relaxed convex problem.

$$\underset{G_{b,z}, \forall z \in \mathcal{Z}_b}{\text{maximize}} \min_{\forall v \in \mathcal{V}_k^b} \text{Tr}(G_{b,z} H_{b,z}^v), \quad (15)$$

$$\text{subject to: } \text{Tr}(G_{b,z}) = 1, G_{b,z} \succeq 0.$$

Optimization problem (15) is in the well-known semi-definite problem (SDP) form. Each RSU can solve this downlink multicasting beamforming optimization problem using widely popular convex optimization solver such as CVX. Each RSU finds the downlink multicasting beamforming vector and distributes the model to all associated agents. Note that since the entire bandwidth is used for this downlink distribution, the $d_v^{down}$ is relatively low. Moreover, the RSU-agent associations will remain unchanged for this short time.

Local Model Offloading Optimization

Upon finishing the local model training, the vehicle agent requests uplink radio resources from its associated RSU to offload the trained model $w_k^v$. The RSU then allocates the pRB for this uplink communication. Assume RSUs have perfect CSI. Therefore, each RSU can use maximal ratio combining (MRC) to model the receiver beamforming vector, i.e., $g_{b,z}^v = \check{h}_{b,z}^v / \|\check{h}_{b,z}^v\|$. Moreover, depending on the pRB allocation, the uplink queuing delay $d_v^{up}$ is known to the associated RSU. The scheduling methods such as round-robin can be applied. To that end, each RSU allocates its pRBs to the scheduled agents to maximize the network's uplink throughput. In other words, each RSU aims to solve following optimization problem:

$$\underset{\mathbb{I}_{b,z}^v, \forall v \in \mathcal{V}_k^b}{\text{maximize}} \ \omega \sum_{z_b=1}^{Z_b} \mathbb{I}_{b,z}^v \cdot \log_2(1 + \Gamma_{b,z}^{v,up}), \quad (16)$$

$$\text{subject to } \sum_{z_b=1}^{Z_b} \mathbb{I}_{b,z}^v = 1,$$

$$\sum_{v \in \mathcal{V}_k^b} \mathbb{I}_{b,z}^v = 1,$$

$$\sum_{z_b=1}^{Z_b} \sum_{v \in \mathcal{V}_k^b} \mathbb{I}_{b,z}^v = |\mathcal{Z}_b|,$$

where the first constraint is to allocate only one pRB to each scheduled agent, while the second constraint is adopted to assign a pRB to only one agent. Moreover, the last constraint ensures that all pRBs are allocated. Note that while $|\mathcal{V}_k|$ can be greater than $|\mathcal{Z}_b|$, the RSU can only schedule $|\mathcal{Z}_b|$ agents in a each scheduling K, i.e., $|\mathcal{V}_k^b| = |\mathcal{Z}_b|$.

Note that the optimization problem (16) is a mixed combinatorial problem and NP-hard. The present invention stacks the SNRs over all pRBs into a gain matrix $G_{b,z}$ and use the widely used Hungarian algorithm to find the optimal pRB allocations. This process is described in FIG. 6, showing an algorithm that optimally allocates the radio resources to the associated vehicles.

Local Model Training

The present invention considers a synchronous learning framework, where the learning server provides all agents a deadline $d^{cmp}$ to complete their local model training. In other words, in each global training round k, the vehicle agent receives the global model and performs local model training until $d^{cmp}$ expires. Recall that the global round update clock time is known to all agents. Therefore, during global training round k, upon receiving the global model $w_k$, each agent v ∈ $V_k$ can determine the remaining time budget for its local model computation as $$d_v^{cmp} = d^{cmp} - d_v^{down}. \quad (17)$$

Therefore, agent v determines its local model training iterations as $$L_v = \text{floor}\left(\frac{d_v^{cmp}}{d_v^{itr}}\right). \quad (18)$$

This essentially means that agent v ∈ $\mathcal{V}_k$ performs $L_v$ local stochastic gradient decent (SGD) steps to minimize its local objective function defined in (8). Note that, unlike FedAvg that considers equal $L_1 = \ldots = L_v$, FedProx allows heterogeneous device participation to utilize agents' resources efficiently.

Note that with $d_v^{down}$ and $d_v^{up}$ being minimized, the $d^{cmp}$ can be selected to maximize $d_v^{cmp}$. Furthermore, FedAvg is a special case of the FedProx with common training iteration $L_v$ and μ=0 in problem (8).

Vehicle-RSU Association

Vehicles can be associated to RSUs using different methods. FIG. 7 shows an algorithm that associates vehicles to RSUs based on distance according to some embodiments of the present invention. In general, if a vehicle is close to an RSU, the link quality should be good. As such, model transmission delay between vehicle and RSU should be shorter.

Selection of the Vehicle Agents

Selecting the learning agents in dynamic vehicle pool is challenging because vehicles come and go. Therefore, vehicle pool changes dynamically. On the one hand, the learning server does not directly communicate with the on-road vehicles. The on-road vehicles connect to the RSUs and report their link quality measurements of the reference signal received powers (RSRPs) only to their associated RSUs. On the other hand, an RSU has link quality information only for its associated vehicles and does not have link quality information of the vehicles associated with other RSUs. Accordingly, the learning server coordinates with the RSUs in the learning agent selection. Followings are methods that can be used to select vehicle agents:

1) Selection Method-1 (SM1): randomly select vehicle agents
2) Selection Method-2 (SM2): select vehicles that will keep connecting to their associated RSUs for longer, e.g., vehicles close to their associated RSUs.
3) Selection Method-3 (SM3): select vehicles that have better link quality to their associated Rus.
4) Selection Method-4 (SM4): Select vehicles that had better performance in previous training round, e.g., vehicles with smaller training loss.
5) Selection Method-5 (SM5): select vehicles that have larger datasets.
6) Selection Method-6 (SM6): select vehicles that have more commutation resources.

Summary of the Provided Distributed Learning Solution

The invented communication and computation aware distributed learning solution is summarized in FIG. 8, which illustrates the vehicular federated learning (FL) algorithm according to some embodiments of the present invention. In each global training round k, the learning server selects a set of vehicle agents to train the global model. The learning server broadcasts the model $w_k$, the agent set $\mathcal{V}_k$, time deadlines $d^{cmp}$ and $d^{thr}$ to RSUs. Each RSU then computes optimal downlink communication delays for its associated agents and broadcasts the model $w_k$ and the $d_v^{cmp}$ to its agents. Based on the $d_v^{cmp}$ and its local dataset $D_v$, each agent v performs independent model training for $L_v$ iterations. At training deadline $d^{cmp}$, each RSU schedules its agents to offload their local models to satisfy deadline threshold $d^{thr}$.

Figure 9:
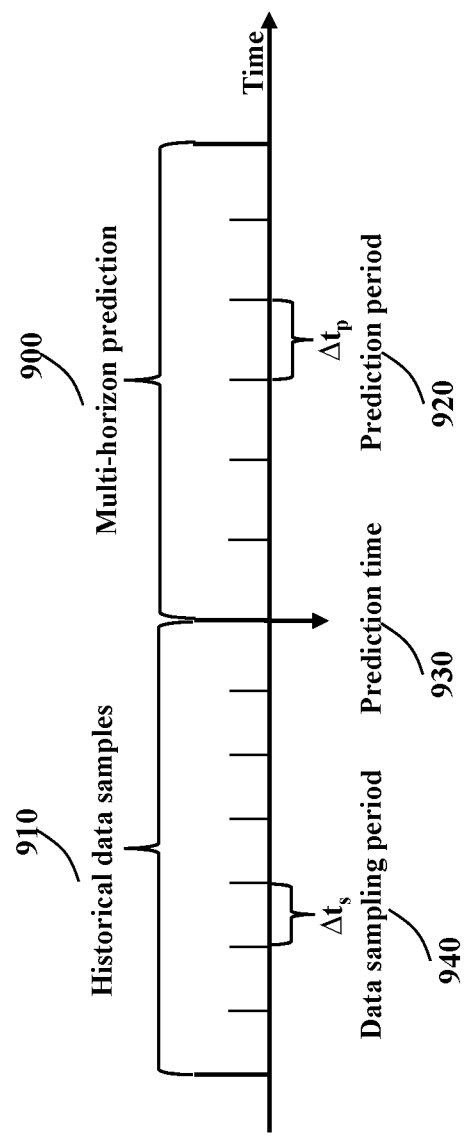
FIG. 9 demonstrates a multi-horizon prediction with six predictions by using seven historical data samples, according to some embodiments of the present invention.

The well-trained models can be applied by on-road vehicles for their prediction tasks. The machine learning models provided the embodiments of the present invention allows multi-horizon predictions, i.e., make multiple predictions at a prediction time. FIG. 9 demonstrates a multi-horizon prediction with six predictions 900 by using seven historical data samples 910 at prediction time 930. The data sampling period 940 is $\Delta t_s$ and the prediction period 920 is $\Delta t_p$.

Figure 10:
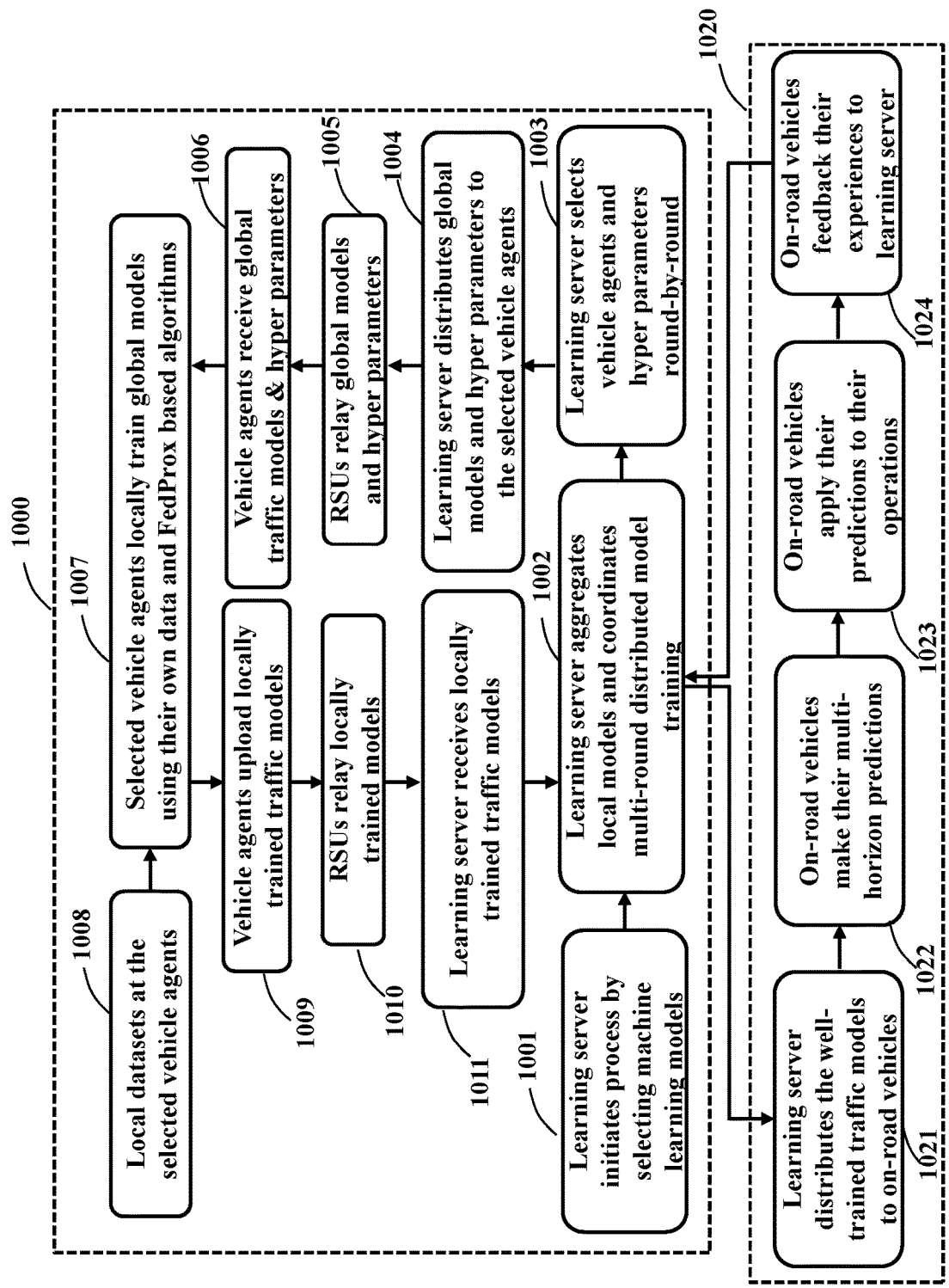
FIG. 10 shows functional blocks the distributed machine learning training phase and application phase, according to some embodiments of the present invention.

FIG. 10 shows functional blocks the distributed machine learning training phase and application phase, according to some embodiments of the present invention, where block 1000 shows the model training process and block 1020 illustrates the model application process. For model training, the learning server initiates the learning process 1001 by selecting the machine learning models. The learning server then coordinates multi-round distributed model training 1002. To do so, the learning server selects vehicle agents and model training hyperparameters 1003. The learning server distributes global machine learning models and hyper parameters to the selected vehicle agents 1004 via RSUs, which then relay models and hyperparameters to the selected vehicle agent 1005. Upon receiving global models and hyperparameters 1006, vehicle agents locally train machine learning models 1007 using their local datasets 1008 and FedProx based algorithms provided in FIG. 8. When local training time expires, vehicle agents upload locally trained models to the learning server 1009 via RSUs, which relay the locally trained models to the learning server 1010. Upon receiving the locally trained models 1011, the learning server aggregates local models and coordinates next round of training 1002.

Once the machine learning models are well-trained, the learning server distributes models 1021 to the on-road vehicles, which use the trained models to make their multi-horizon predictions 1022. The on-road vehicles then apply their predictions to their operations 1023. In addition, the on-road vehicles can feedback their experiences 1024 to the learning server for model enhancement.

4. Applications

The distributed machine learning model can be applied for various vehicular application tasks such as velocity prediction and location prediction. Vehicle-specific power (VSP) is another application. In essence, VSP provides the estimation of the required power demand for the vehicle. For zero road grade, the VSP can be calculated as $$P_v^t = \left(\frac{c_1}{c_2}\right)\frac{Au_v^t}{m_v} + \left(\frac{c_1^2}{c_2}\right)\frac{Bu_v^{t2}}{m_v} + \left(\frac{c_1^3}{c_2}\right)\frac{Cu_v^{t3}}{m_v} + c_1^2 u_v^t a_v^t, \quad (19)$$

where $m_v$, $u_v^t$ and $a_v^t$ are vehicle v's weight, instantaneous velocity and instantaneous acceleration, respectively. Moreover, A, B, C, $c_1$ and $c_2$ are coefficients. The VSP can be predicted in two ways: (i) predicting velocity and then using the predicted velocity to compute VSP via equation (19) and (ii) predicting VSP directly. The approach (i) does not work well because VSP is expressed as a third-order polynomial in velocity with additional velocity acceleration product term. Accordingly, it is very sensitive to velocity variation. Even with near ground truth velocity prediction, the VSP accuracy can be poor. Therefore, the approach (ii) should be applied.

We claim:

1. A computer-implemented method for training a global machine learning model using a learning server and a set of vehicle agents connected to roadside units (RSUs), wherein the method uses a processor coupled with a memory storing instructions implementing the method, wherein the instructions, when executed by the processor, carry out at steps of the method, comprising:
    selecting vehicle agents from a pool of the vehicles connected to the RSUs, wherein the vehicle agents include on-board computer units and on-board sensors configured to collect local data through trajectories of the selected vehicle agents on roads;
    associating the selected vehicle agents and the RSUs respectively based on distances from the selected vehicle agents to the RSUs configured to provide measurements of the distances to the learning server;

transmitting a global model $w_k$, a selected agent set $V_k$ and deadline thresholds $d^{cmp}$ and deadline thresholds $d^{thr}$ in each global training round k to the RSUs configured to multicast the global model $w_k$ and training deadlines $d_v^{cmp}$ to the selected vehicle agents, wherein the associated RSUs compute the training deadlines $d_v^{cmp}$ of the corresponding selected vehicle agents, wherein the selected vehicle agents locally train the global model $w_k$ independently using the local datasets collected by the on-board sensors of the selected vehicle agents to generate locally trained models, wherein the deadline thresholds $d^{cmp}$ and $d^{thr}$ are determined in each global training round such that $d^{cmp} < d^{thr}$, wherein the deadline threshold $d^{cmp}$ is a deadline for the selected vehicle agents to finish locally training the global model and the deadline threshold $d^{thr}$ is a deadline for the selected vehicle agents to finish uploading the locally trained models, wherein with a given deadline threshold $d^{thr}$, a total delay $d_v^{tot}$ of a vehicle agent v is determined such that the total delay $d_v^{tot}$ is less than the given deadline threshold $d^{thr}$, i.e., $d_v^{tot} \leq d^{thr}$; and aggregating the locally trained models from the selected vehicle agents via the associated RSUs to update the global model until the global training round reaches a pre-determined threshold.

2. The method of claim 1, wherein with a given deadline threshold $d^{cmp}$, a training deadline $d_v^{cmp}$ for the vehicle agent v is determined using the given deadline threshold $d^{cmp}$ and global model distribution delay $d_v^{down}$ such that a summation of the global model distribution delay and the training deadlines $d_v^{cmp}$ is less than the given deadline threshold $d^{cmp}$, i.e., $d_v^{down} + d_v^{cmp} \leq d^{cmp}$.

3. The method of claim 1, wherein the total delay $d_v^{tot}$ of the vehicle agent v is a summation of the global model distribution $d_v^{down}$, the model training delay $d_v^{cmp}$, the uplink queuing delay $d_v^{q,up}$ and the local model uploading delay $d_v^{up}$, i.e. $d_v^{tot} = d_v^{down} + d_v^{cmp} + d_v^{q,up} + d_v^{up}$.

4. The method of claim 3, wherein the $d_v^{down}$ is downlink global distribution delay of vehicle agent v calculated as $$d_v^{down} = \kappa \times \min\left\{T : \kappa \times \left(\sum\nolimits_{\bar{t}=1}^{T} C_v^{dn}(\bar{t})\right) \geq S, T \in \mathbb{Z}^+\right\}.$$

5. The method of claim 3, wherein the $d_v^{up}$ is uplink locally trained model uploading delay of vehicle agent v calculated as $$d_v^{up} = \kappa \times \min\left\{T : \kappa \times \left(\sum\nolimits_{\bar{t}=1}^{T} C_v^{up}(\bar{t})\right) \geq S, T \in \mathbb{Z}^+\right\}.$$

6. The method of claim 3, wherein the $d_v^{q,up}$ is uplink queueing delay of the locally trained model uploading delay of vehicle agent v calculated as $d_v^{q,up} \leq d^{thr} - d^{cmp} - d_v^{up}$.

7. The method of claim 3, wherein the $d_v^{cmp}$ is the local model training delay of vehicle agent v calculated as $d_v^{cmp} = d^{cmp} - d_v^{down}$.

8. The method of claim 1, wherein the learning server and the RSUs are connected via communication links between RSUs and the learning server.

9. The method of claim 1, wherein the training data include at least one or more than two combinations of longitude, latitude, velocity, acceleration, weather information along a road with respect to each of the vehicle agents.

10. The method of claim 1, wherein the vehicle agents are selected using one or a combination of methods among (1) randomly selecting vehicle agents, (2) selecting vehicles that keep connecting to the associated RSUs for longer connection time, (3) selecting vehicles that have better link quality to their associated RSUs, (4) selecting vehicles that had better performance in previous training round, (5) selecting vehicles that have larger datasets, and (6) selecting vehicles that have more computation resources.

11. The method of claim 1, wherein the global model is parameterized by w representing the weights of neural network of the machine learning model.

12. The method of claim 1, wherein a vehicle agent v uses following FedProx based objective function $$\tilde{f}_v(w; w_k) = f_v(w) + \frac{\mu}{2}\|w - w_k\|^2$$

for the global model training.

13. The method of claim 1, wherein a vehicle agent v independently determines the number of local training iterations in each global training round k according to $$L_v = \text{floor}\left(\frac{d_v^{cmp}}{d_v^{itr}}\right),$$

where $d_v^{itr}$ is the time for one iteration of model training computed using its on-board computation power $\rho_v$ and local dataset $D_v$.

14. A computer-implemented communication method for causing a learning server to update a global model by providing locally trained models from vehicle agents selected by the learning server, wherein the method uses a processor coupled with a memory storing instructions implementing the method, wherein the instructions, when executed by the processor carry out at steps of the method, comprising:

acquiring information on associated vehicle agents, a global model $w_k$ and deadline thresholds $d^{cmp}$ and $d^{thr}$ from the learning server;

optimizing downlink model distribution delay $d_v^{down}$ by maximizing data rate for the associated vehicle agents via solving following multicast beamforming optimization problem $$\underset{G_{b,z}, \forall z \in \mathcal{Z}_b}{\text{maximize}} \ \underset{\forall v \in \mathcal{V}_k^b}{\min} \ Tr(G_{b,z} H_{b,z}^v),$$

subject to: $Tr(G_{b,z}) = 1, G_{b,z} \succeq 0$.

computing downlink communication delays $d_v^{down}$ for the associated vehicle agents, wherein respective training deadlines $d_v^{cmp}$ of the associated vehicle agents are determined based on the deadline threshold $d^{cmp}$ and the downlink communication delays $d_v^{down}$ for the associated vehicle agents;

multicasting the global model and the training deadlines $d_v^{down}$ to the associated vehicle agents;

allocating optimal uplink resources, in response requests from the associated vehicle agents that have trained global model at the training deadlines based on the training data collected by on-board sensors of the associated vehicle agents to generate locally trained models, to allow the associated vehicle agents upload the locally trained models with the minimal delays $d_v^{up}$ by solving following combinatorial optimization problem $$\underset{\mathbb{I}_{b,z}^v, \forall v \in \mathcal{V}_k^b}{\text{maximize}} \; \omega \sum_{z_b=1}^{Z_b} \mathbb{I}_{b,z}^v \cdot \log_2\left(1 + \Gamma_{b,z}^{v,up}\right),$$

$$\text{subject to} \quad \sum_{z_b=1}^{Z_b} \mathbb{I}_{b,z}^v = 1,$$

$$\sum_{v \in \mathcal{V}_k^b} \mathbb{I}_{b,z}^v = 1,$$

$$\sum_{z_b=1}^{Z_b} \sum_{v \in \mathcal{V}_k^b} \mathbb{I}_{b,z}^v = |Z_b|,$$

and
receiving and transmitting the locally trained models uploaded from the associated vehicle agents to the learning server.

15. The method of claim 14, wherein the steps of acquiring and transmitting the global model and the locally trained models between the learning server and the RSUs are performed via communication links between the RSUs and the learning server.

16. The method of claim 14, wherein the steps of receiving and transmitting the global model and the locally trained models between the RSUs and the vehicle agents are performed via wireless links.

17. The method of claim 14, wherein the uplink resource allocation is performed to respective physical resource blocks (pRBs) arranged on the associated vehicle agents to maximize a throughput of the uplink communication.

18. The method of claim 14, wherein the local training time is determined such that a summation of a global model distribution delay from the learning server to the associated vehicle agents and a local model training delay corresponding of each vehicle agent is less than the deadline threshold $d^{cmp}$, and a summation of a global model distribution delay from the learning server to the associated vehicle agents, a local model training delay corresponding to a training deadline of each vehicle agent, an uplink queuing delay and a local model uploading delay from the selected vehicle agents is determined to be less than the deadline threshold $d^{thr}$.

19. A communication and computation aware distributed machine learning system for vehicular networks including a learning server communicating with a set of roadside units (RSUs) and on-road vehicles to train a global machine learning model in distributed fashion, wherein the system includes a processor coupled with a memory storing instructions implementing a method, wherein the instructions, when executed by the processor, carry out each of the following steps of the method, comprising:

selecting a set of on-road vehicles as learning agents from the on-road vehicles;

determining a training deadline threshold to finish training local model by the learning agents;

determining an upload deadline threshold to finish uploading the locally trained model by the learning agents;

associating, to provide continuous connection between the learning server and the learning agents, the learning agents with the RSUs using one or a combination of methods among (1) randomly selecting vehicle agents, (2) selecting vehicles that keep connecting to the associated RSUs for longer connection time, (3) selecting vehicles that have better link quality to their associated RSUs, (4) selecting vehicles that had better performance in previous training round, (5) selecting vehicles that have larger datasets, and (6) selecting vehicles that have more computation resources;

distributing a global machine learning model to the selected learning agents via the associated RSUs by performing downlink multicast beamforming to minimize global machine learning model distribution delay using the associated RSUs, wherein the learning agents including on-board processing units collect local data along roads using on-board sensors and cluster the collected local data based on vehicular environment of the learning agents, wherein each of the learning agents determines local model training iterations based computation power and data sizes to satisfy a summation of the training deadline threshold and the upload deadline threshold, wherein each of the learning agents trains the global machine learning model locally using the collected local data for the determined local model training iterations, the learning agents reporting channel measurements to the associated RSUs and adjacent unassociated RSUs for performing a best handover from the currently associated RSUs;

allocating optimal uplink radio resources of physical resource blocks (pRBs) of the associated RSUs to the associated learning agents to minimize local model uploading delay and queuing delay of the learning agents; and aggregating the locally trained models received from the selected vehicle agents via the allocated optimal uplink radio resources of the RSUs to update the global model.

20. The system of claim 19, wherein the learning server determines two time thresholds in each global training round of the distributing global model and the aggregating locally trained models to restrict uplink queuing delays via the learning agents, local model training delay of the on-board processing unit of the learning agent, downlink delay of the global machine learning model transmission and uplink delay of the locally trained model transmission.

21. The system of claim 20, wherein the learning server is configured to iteratively perform the distributing and the aggregating until the global training round reaches a predetermined threshold.

22. The system of claim 19, wherein the associated RSU is located at a shortest distance from the learning agent compared to unassociated RSUs.

* * * * *